US012804687B2

(12) United States Patent
Hong

(10) Patent No.: US 12,804,687 B2
(45) Date of Patent: Nov. 17, 2026

(54) METHOD AND DEVICE FOR TRANSMITTING/RECEIVING INTER-UE COORDINATION INFORMATION IN CONNECTION WITH SIDELINK COMMUNICATION

(71) Applicants: HYUNDAI MOTOR COMPANY, Seoul (KR); KIA CORPORATION, Seoul (KR)

(72) Inventor: Ui Hyun Hong, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 314 days.

(21) Appl. No.: 18/397,705

(22) Filed: Dec. 27, 2023

(65) Prior Publication Data

US 2024/0205944 A1 Jun. 20, 2024

Related U.S. Application Data

(63) Continuation of application No. PCT/KR2022/009239, filed on Jun. 28, 2022.

(30) Foreign Application Priority Data

Jun. 30, 2021 (KR) ........................ 10-2021-0085668
Sep. 27, 2021 (KR) ........................ 10-2021-0127426
Jan. 20, 2022 (KR) ........................ 10-2022-0008774

(51) Int. Cl.
*H04W 72/40* (2023.01)
*H04W 72/25* (2023.01)

(52) U.S. Cl.
CPC ........... *H04W 72/40* (2023.01); *H04W 72/25* (2023.01)

(58) Field of Classification Search
CPC .............................. H04W 72/40; H04W 72/25
See application file for complete search history.

(56) References Cited

U.S. PATENT DOCUMENTS

2022/0417919 A1* 12/2022 Shin ...................... H04W 72/40
2023/0148024 A1* 5/2023 Hwang ............. H04W 72/0446 370/329

(Continued)

FOREIGN PATENT DOCUMENTS

EP 3986046 A1 4/2022
EP 4175392 A1 5/2023
WO 2020/198760 A2 10/2020

OTHER PUBLICATIONS

International Search Report dated Sep. 29, 2022 cited in International Patent Application No. PCT/KR2022/009239 (w/English translation).

TCL Communication, "Feasibility and benefits for Mode 2 enhancements," R1-2005774, #3GPP TSG RAN WG1#102-e, Aug. 7, 2020.

(Continued)

*Primary Examiner* — Sujoy K Kundu
*Assistant Examiner* — Weibin Huang
(74) *Attorney, Agent, or Firm* — Morgan Lewis & Bockius LLP

(57) ABSTRACT

A method for first UE includes the steps of: transmitting a first SCI comprising first inter-UE coordination information to second UE through a control channel; generating second inter-UE coordination information comprising offset information regarding a preferred resource or a non-preferred resource; and transmitting a second SCI including the second inter-UE coordination information to the second UE through a data channel scheduled by the first SCI.

18 Claims, 6 Drawing Sheets

(56) References Cited

U.S. PATENT DOCUMENTS

| | | | | |
|---|---|---|---|---|
| 2024/0179730 | A1* | 5/2024 | Yue | H04W 72/54 |
| 2024/0188048 | A1* | 6/2024 | Luo | H04W 72/0446 |
| 2024/0260003 | A1* | 8/2024 | Guo | H04W 72/02 |
| 2024/0260059 | A1* | 8/2024 | Guo | H04W 72/25 |
| 2024/0389114 | A1* | 11/2024 | Wu | H04W 76/14 |

OTHER PUBLICATIONS

Nokia, et al., "Inter-UE coordination in sidelink resource allocation mode 2," R1-2102362, #3GPP TSG RAN WG1#104b-e, e-Meeting Apr. 12-20, 2021.

Nokia, et al., "Inter-UE coordination in mode 2 sidelink resource allocation," R1-2104177, #3GPP TSG RAN WG1#105-e, e-Meeting May 10-27, 2021.

LG Electronics, "Discussion on feasibility and benefits for mode 2 enhancement," R1-2007896, #3GPP TSG RAN WG1#103-e, e-Meeting Nov. 1, 2020.

LG Electronics, "Summary for AI 8.11.2.2 Feasibility and benefits for mode 2 enhancements," R1-2007412, #3GPP TSG RAN WG1#102-e, e-Meeting Aug. 17-28, 2020.

LG Electronics, "Feature lead summary for AI 8.11.2.2 Feasibility and benefits for mode 2 enchancements," R1-2009788, #3GPP TSG RAN WG1#103-e, e-Meeting Oct. 26 through Nov. 13, 2020.

LG Electronics, "Feature lead summary for AI 8.11.2.2 Feasibility and benefits for mode 2 enchancements," R1-2102167, #3GPP TSG RAN WG1#104-e, e-Meeting Jan. 25 through Feb. 5, 2021.

LG Electronics, "Feature lead summary for AI 8.11.2.2 Inter-UE coordination for Mode 2 enhancements," R1-2104103, #3GPP TSG RAN WG1#104bis-e, e-Meeting Apr. 12-20, 2021.

LG Electronics, "WID revision: NR sidelink enhancement," R1-201385, #3GPP TSG RAN Meeting #88-e, Electronic Meeting Jun. 29-Jul. 3, 2020.

3rd Generation Partnership Project; Technical Specification Group Radio Access Network; NR; Medium Access Control (MAC) protocol specification (Release 16).

* cited by examiner

METHOD AND DEVICE FOR TRANSMITTING/RECEIVING INTER-UE COORDINATION INFORMATION IN CONNECTION WITH SIDELINK COMMUNICATION

CROSS-REFERENCE TO RELATED APPLICATION

The present application is a continuation-in-part of currently pending International Patent Application No. PCT/KR2022/009239, filed Jun. 28, 2022, which claims priority to Korean Patent Application Number 10-2022-0008774 filed Jan. 20, 2022, Korean Patent Application Number 10-2021-0127426 filed Sep. 27, 2021, and Korean Patent Application Number 10-2021-0085668 filed Jun. 30, 2021, the entire contents of which are incorporated herein for all purposes by these references.

BACKGROUND OF THE PRESENT DISCLOSURE

Field of the Present Disclosure

The present disclosure relates to a sidelink communication technique, and more particularly, to a technique for transmitting and receiving inter-user equipment (UE) coordination information.

Description of Related Art

A Fifth-Generation (5G) communication system (e.g., New Radio (NR) communication system) which uses a frequency band higher than a frequency band of a Fourth-Generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g. C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g. C-V2X communications) may be performed based on sidelink communication technologies (e.g. Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g. periodic sidelink data) may be transmitted using the CG resources.

Meanwhile, inter-UE coordination information may be used in sidelink communication. A UE-A may transmit inter-UE coordination information to a UE-B, and the UE-B may select candidate resource(s) based on the inter-UE coordination information received from the UE-A. However, since methods for transmitting and receiving inter-UE coordination information are not clearly defined, specific methods for transmitting and receiving inter-UE coordination information are needed.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present disclosure are directed to providing a method and an apparatus for transmitting and receiving inter-UE coordination information in sidelink communication.

A method of a first user equipment (UE), according to various exemplary embodiments of the present disclosure for achieving the above-described objective, may include: transmitting, to a second UE, first sidelink control information (SCI) including first inter-UE coordination information through a control channel; generating second inter-UE coordination information including offset information for preferred resources or non-preferred resources; and transmitting, to the second UE, second SCI including the second inter-UE coordination information through a data channel scheduled by the first SCI.

The first inter-UE coordination information may be information indicating that the second SCI including the second inter-UE coordination information is transmitted.

The offset information may indicate a slot offset, and the slot offset may be an offset between a reference slot and a slot where the preferred resources or the non-preferred resources are located.

The slot may be a first slot among slots where the preferred resources or the non-preferred resources are located, and the reference slot may be a slot where the first SCI is transmitted.

The offset information may indicate a subchannel offset, and the subchannel offset may be an offset between a reference subchannel and a subchannel where the preferred resources or the non-preferred resources are located.

The subchannel may be a first subchannel among subchannels where the preferred resources or the non-preferred resources are located, and the reference subchannel may be a slot where the first SCI is transmitted.

The second inter-UE coordination information may further include priority information for the second inter-UE coordination information.

A method of a second user equipment (UE), according to various exemplary embodiments of the present disclosure for achieving the above-described objective, may include: receiving, from a first UE, first sidelink control information (SCI) including first inter-UE coordination information through a control channel; receiving, from the first UE, second SCI including second inter-UE coordination information through a data channel scheduled by the first SCI; identifying preferred resources or non-preferred resources based on offset information for the preferred resources or the non-preferred resources, the offset information being included in the second inter-UE coordination information;

selecting resources for sidelink communication in consideration of the preferred resources or the non-preferred resources; and performing the sidelink communication using the selected resources.

The first inter-UE coordination information may be information indicating that the second SCI including the second inter-UE coordination information is transmitted.

The offset information may indicate a slot offset, and the slot offset may be an offset between a reference slot and a slot where the preferred resources or the non-preferred resources are located.

The slot may be a first slot among slots where the preferred resources or the non-preferred resources are located, and the reference slot may be a slot where the first SCI is received.

The offset information may indicate a subchannel offset, and the subchannel offset may be an offset between a reference subchannel and a subchannel where the preferred resources or the non-preferred resources are located.

The subchannel may be a first subchannel among subchannels where the preferred resources or the non-preferred resources are located, and the reference subchannel may be a slot where the first SCI is received.

The second inter-UE coordination information may further include a first priority for the second inter-UE coordination information.

The method may further include: receiving, from a third UE, third inter-UE coordination information including a second priority; and comparing the first priority of the second inter-UE coordination information and the second priority of the third inter-UE coordination information, wherein when the first priority is higher than the second priority, the second inter-UE coordination information is used to select resources for the sidelink communication.

A second user equipment (UE), according to various exemplary embodiments of the present disclosure for achieving the above-described objective, may include:

a processor; and a memory storing one or more instructions executable by the processor. The one or more instructions may be executed to perform: receiving, from a first UE, first sidelink control information (SCI) including first inter-UE coordination information through a control channel; receiving, from the first UE, second SCI including second inter-UE coordination information through a data channel scheduled by the first SCI; identifying preferred resources or non-preferred resources based on offset information for the preferred resources or the non-preferred resources, the offset information being included in the second inter-UE coordination information; selecting resources for sidelink communication in consideration of the preferred resources or the non-preferred resources; and performing the sidelink communication using the selected resources.

The first inter-UE coordination information may be information indicating that the second SCI including the second inter-UE coordination information is transmitted.

The offset information may indicate a slot offset, the slot offset may be an offset between a reference slot and a slot where the preferred resources or the non-preferred resources are located, and the reference slot may be a slot where the first SCI is received.

The offset information may indicate a subchannel offset, the subchannel offset may be an offset between a reference subchannel and a subchannel where the preferred resources or the non-preferred resources are located, and the reference subchannel may be a slot where the first SCI is received.

The one or more instructions may be further executed to perform: receiving, from a third UE, third inter-UE coordination information including a second priority; and comparing a first priority of the second inter-UE coordination information and the second priority of the third inter-UE coordination information, wherein when the first priority is higher than the second priority, the second inter-UE coordination information is used to select resources for the sidelink communication, and wherein the first priority is included in the first inter-UE coordination information.

According to an exemplary embodiment of the present disclosure, a UE-A may transmit inter-UE coordination information to a UE-B, and the inter-UE coordination information may be classified into first inter-UE coordination information and second inter-UE coordination information. The first inter-UE coordination information may be information indicating that the second inter-UE coordination information is transmitted, and the second inter-UE coordination information may include information required for resource selection. For example, the second inter-UE coordination information may include offset information for preferred resources or non-preferred resources. The UE-B may determine a position of preferred resources or non-preferred resources based on the offset information, select resources considering the preferred resources or the non-preferred resources, and perform sidelink communication using the selected resources. Accordingly, the sidelink communication can be performed efficiently.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
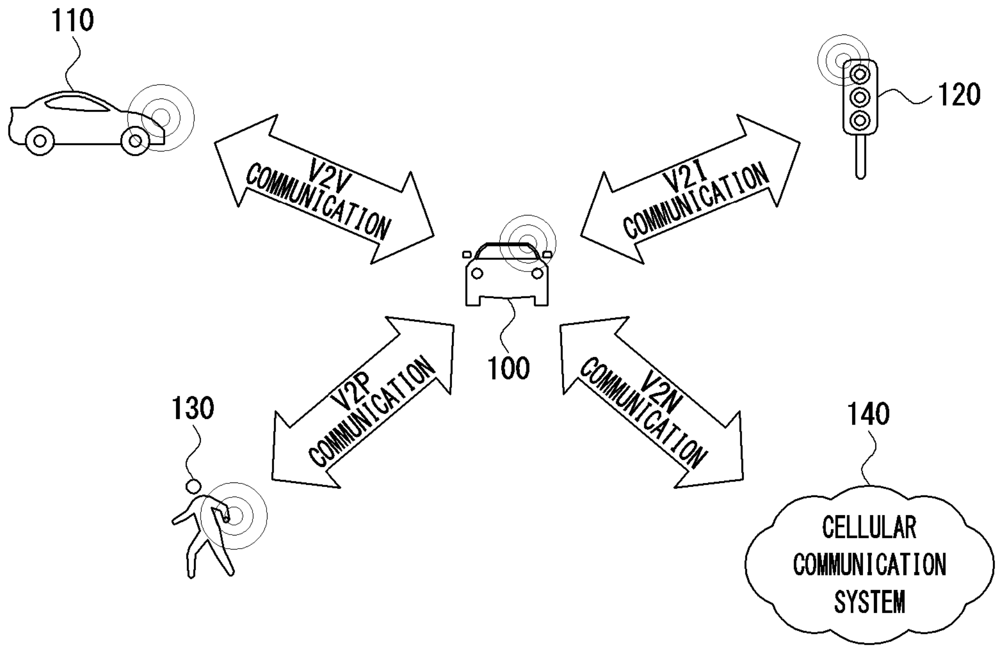
FIG. 1 is a conceptual diagram illustrating V2X communication scenarios.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present disclosure, it will be understood that the present description is not intended to limit the invention(s) to those exemplary embodiments. On the contrary, the invention(s) is/are intended to cover not only the exemplary embodiments of the present disclosure, but also various alternatives, modifications, equivalents and other embodiments, which may be included within the spirit and scope of the invention as defined by the appended claims.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In exemplary embodiments of the present disclosure, (re)transmission may mean 'transmission', 'retransmission', or 'transmission and retransmission', (re)configuration may mean 'configuration', 'reconfiguration', or 'configuration and reconfiguration', (re)connection may mean 'connection', 'reconnection', or 'connection and reconnection', and (re)access may mean 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g. a cellular communication system 140), and the V2X communications supported by the cellular communication system 140 may be referred to as "Cellular-V2X (C-V2X) communications." Here, the cellular communication system 140 may include the 4G communication system (e.g. LTE communication system or LTE-A communication system), the 5G communication system (e.g. NR communication system), and the like.

The V2V communications may include communications between a first vehicle 100 (e.g. a communication node located in the vehicle 100) and a second vehicle 110 (e.g. a communication node located in the vehicle 110). Various driving information such as velocity, heading, time, position, and the like may be exchanged between the vehicles 100 and 110 through the V2V communications. For example, autonomous driving (e.g. platooning) may be supported based on the driving information exchanged through the V2V communications. The V2V communications supported in the cellular communication system 140 may be performed based on "sidelink" communication technologies (e.g. ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g. the communication node located in the vehicle 100) and an infrastructure (e.g. road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g. ProSe and D2D communication technologies, and the like). In the instant case, the communications between the vehicle 100 and the infrastructure 120 may be performed using at least one sidelink channel established between the vehicle 100 and the infrastructure 120.

The V2P communications may include communications between the first vehicle 100 (e.g. the communication node located in the vehicle 100) and a person 130 (e.g. a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g. ProSe and D2D communication technologies, and the like). In the instant case, the communications between the communication node located in the vehicle 100 and the communication node carried by the person 130 may be performed using at least one sidelink channel established between the communication nodes.

The V2N communications may be communications between the first vehicle 100 (e.g. the communication node located in the vehicle 100) and a server connected through the cellular communication system 140. The V2N communications may be performed based on the 4G communication technology (e.g. LTE or LTE-A) or the 5G communication technology (e.g. NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
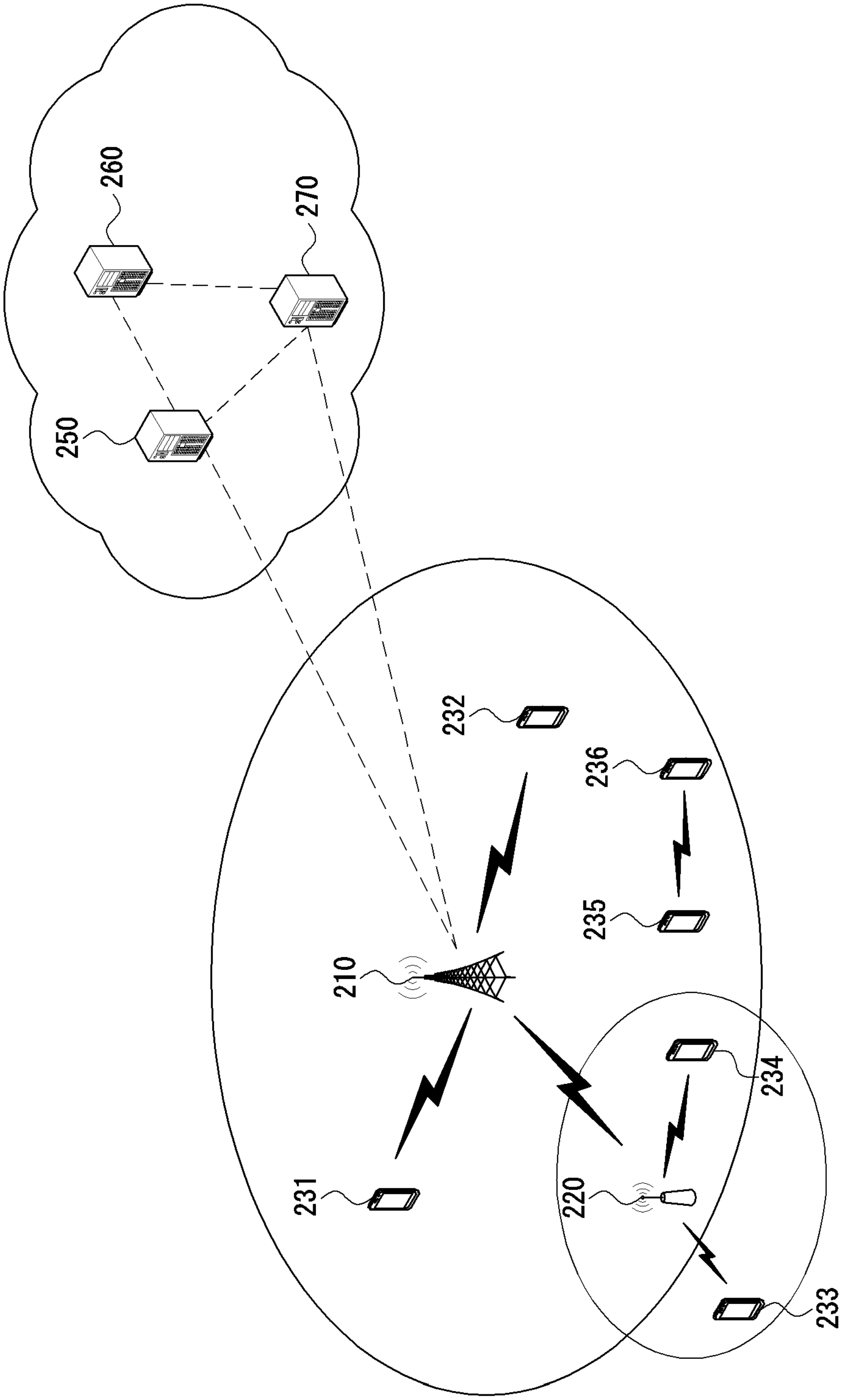
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231, 232, 233, 234, 235 and 236, and the like. The UEs 231, 232, 233, 234, 235 and 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g. a V2V network slice, a V2I network slice, a V2P network slice, a V2N network slice, etc.) may be configured, and the V2X communications may be supported through the V2X network slice configured in the core network.

The communication nodes (e.g. base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g. base station, relay, UE, S-GW, P-GW, MME, UPF, SMF, AMF, etc.) including the cellular communication system may be configured as follows.

Figure 3:
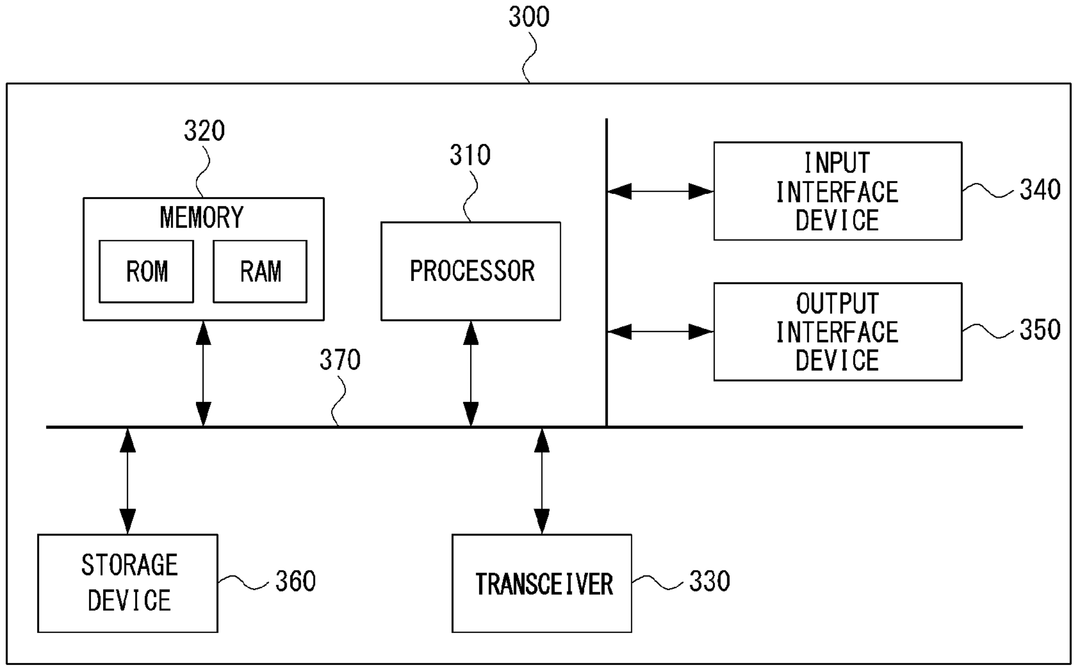
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may include at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231, 232, 233, 234, 235 and 236 and the relay 220, and may transmit signals received from the UEs 231, 232, 233, 234, 235 and 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g. single user (SU)-MIMO, multi-user (MU)-MIMO, massive MIMO, etc.), coordinated multipoint (CoMP) communication technologies, carrier aggregation (CA) communication technologies, unlicensed band communication technologies (e.g. Licensed Assisted Access (LAA), enhanced LAA (eLAA), etc.), sidelink communication technologies (e.g. ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231, 232, 233, 234, 235 and 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g. the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g. the UEs 235 and 236) performing sidelink communications may be configured as follows.

Figure 4:
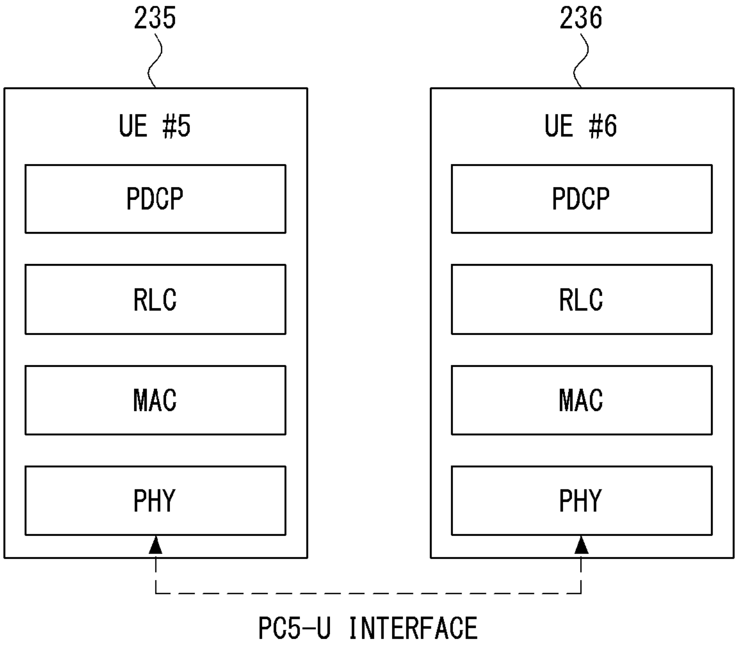
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g. PC5-U interface). A layer-2 identifier (ID) (e.g. a source layer-2 ID, a destination layer-2 ID) may be used for the sidelink communications, and the layer 2-ID may be an ID configured for the V2X communications (e.g. V2X service). Also, in the sidelink communications, a hybrid automatic repeat request (HARM) feedback operation may be supported, and an RLC acknowledged mode (RLC AM) or an RLC unacknowledged mode (RLC UM) may be supported.

Meanwhile, a control plane protocol stack of the UEs (e.g. the UEs 235 and 236) performing sidelink communications may be configured as follows.

Figure 5:
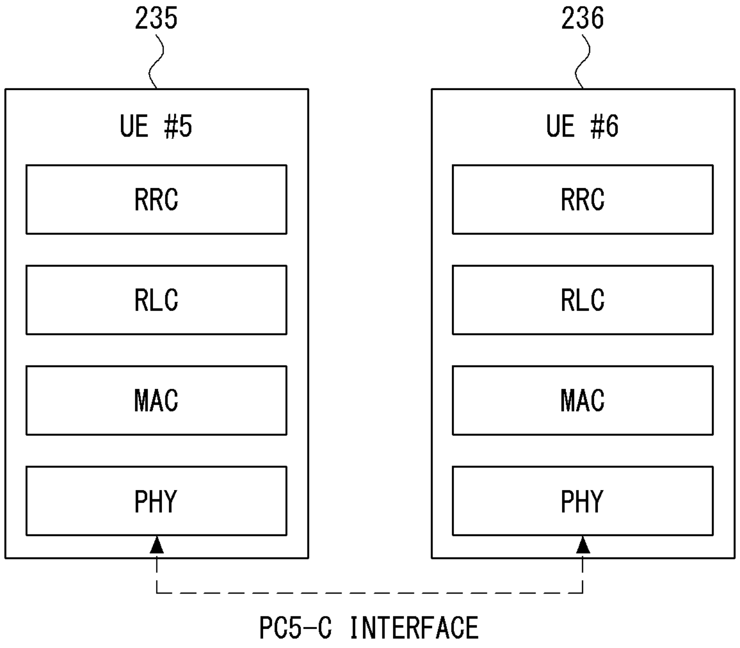
FIG. 5 is a block diagram illustrating various exemplary embodiments of a control plane protocol stack of a UE performing sidelink communication.
Figure 6:
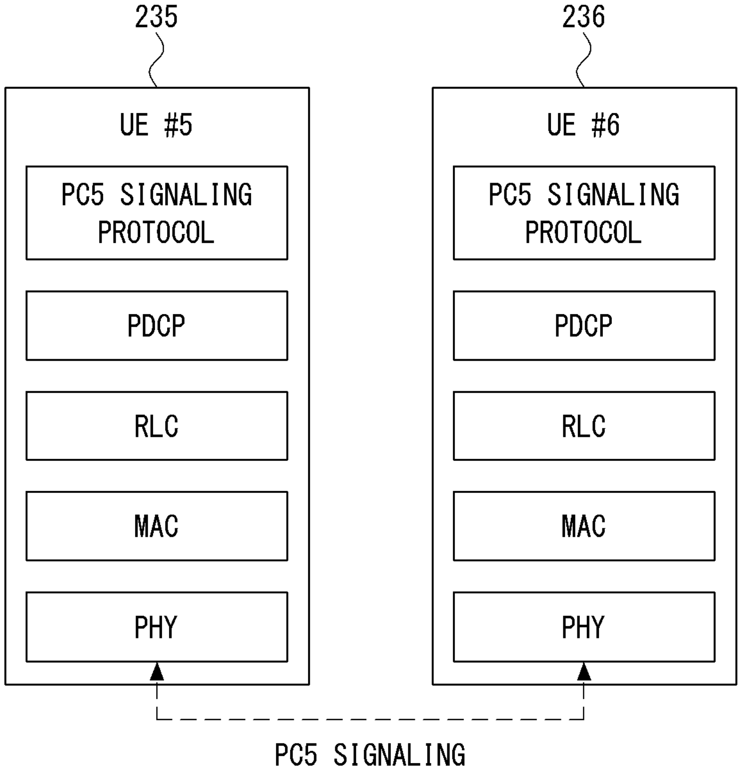
FIG. 6 is a block diagram illustrating various exemplary embodiments of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g. Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g. PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g. UE 235 or 236) by a higher layer signaling. The PSCCH may be used for transmitting and receiving sidelink control information (SCI) and may also be configured in the UE (e.g. UE 235 or 236) by a higher layer signaling.

The PSDCH may be used for a discovery procedure. For example, a discovery signal may be transmitted over the PSDCH. The PSBCH may be used for transmitting and receiving broadcast information (e.g. system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g. a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In the instant case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In the instant case, the sidelink control information may be transmitted through resources selected autonomously by the UE (e.g. UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In the instant case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In the instant case, the sidelink data may be transmitted and received through resources selected autonomously by the UE (e.g. UE 235 or 236) within the resource pool configured by the dedicated RRC signaling procedure or the broadcast RRC signaling procedure.

Hereinafter, sidelink communication methods will be described. Even when a method (e.g. transmission or reception of a signal) to be performed at a first communication node among communication nodes is described, a corresponding second communication node may perform a method (e.g. reception or transmission of the signal) corresponding to the method performed at the first communication node. That is, when an operation of a UE #1 (e.g. vehicle #1) is described, a UE #2 (e.g. vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g. master information block (MIB), system information block (SIB)) and/or an RRC message. The MAC signaling may refer to an operation of transmitting and receiving a MAC control element (CE). The PHY signaling may refer to an operation of transmitting and receiving control information (e.g. downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel.

The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g. sidelink data transmission, sidelink-shared channel (SL-SCH) transmission) may be performed based on one SCI (e.g. 1st-stage SCI). When the multi-SCI scheme is used, data transmission may be performed using two SCIs (e.g. 1st-stage SCI and 2nd-stage SCI). The SCI(s) may be transmitted on a PSCCH and/or a PSSCH. When the single-SCI scheme is used, the SCI (e.g. 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A, a SCI format 2-B, and a SCI format 2-C.

The first-stage SCI may include or more information elements among priority information, frequency resource assignment information, time resource assignment information, resource reservation period information, demodulation reference signal (DMRS) pattern information, second-stage SCI format information, a beta_offset indicator, the number of DMRS ports, and modulation and coding scheme (MCS) information. The second-stage SCI may include one or more information elements among a HARQ processor identifier (ID), a redundancy version (RV), a source ID, a destination ID, CSI request information, a zone ID, and communication range requirements. The SCI format 2-C may be used for decoding of a PSSCH and/or provision of inter-UE coordination information.

In exemplary embodiments, configuration of an operation (e.g. transmission operation) may mean that configuration information (e.g. information element(s), parameter(s)) for the operation and/or information indicating to perform the operation is signaled. Configuration of information element(s) (e.g. parameter(s)) may mean that the information element(s) are signaled. The signaling may be at least one of system information (SI) signaling (e.g. transmission of a system information block (SIB) and/or master information block (MIB)), RRC signaling (e.g. transmission of RRC parameters and/or higher layer parameters), MAC control element (CE) signaling, or PHY signaling (e.g. transmission of downlink control information (DCI), uplink control information (UCI), and/or sidelink control information (SCI)). Here, the MAC CE signaling operation may be performed through a data channel, the PHY signaling operation may be performed through a control channel or a data channel, and transmission of SCI may mean transmission of first-stage SCI and/or second-stage SCI.

Meanwhile, in sidelink communication, inter-UE coordination information may be used. The inter-UE coordination information may be used to solve a hidden node problem, exposed node problem, and/or half-duplex problem. A UE-A may transmit inter-UE coordination information to a UE-B. The UE-A may be a receiving UE (e.g. a UE that receives data), a coordinating UE (e.g. a UE that supports sidelink communication of another UE), or a UE that performs a role similar to that of the coordinating UE. The UE-B may be a transmitting UE (e.g. a UE that transmits data). The UE-A may be referred to as a first UE, and the UE-B may be referred to as a second UE.

The inter-UE coordination information may indicate a resource set. A type of the resource set indicated by the inter-UE coordination information may be classified into a type A, type B, and type C. A resource set having the type A may include preferred (or recommended) resource(s). The preferred resource(s) may be determined based on a sensing result. A resource set having the type B may be include non-preferred (or not-recommended) resource(s). The non-preferred resource(s) may be determined based on a sensing result, an expected resource conflict, and/or a potential resource conflict. A resource set having the type C may include information on a conflicting resource. The conflicting resource may be a resource in which a conflict occurs, a resource in which a conflict is expected to occur, or a resource having a potential conflict. In addition, the inter-UE coordination information may indicate presence of preferred resource(s), presence of non-preferred resource(s), or presence of conflicting resource(s). In exemplary embodiments, a resource set having the type A may be referred to as a resource set A, a resource set having the type B may be referred to as a resource set B, and a resource set having the type C may be referred to as a resource set C.

The UE-B may receive the inter-UE coordination information from the UE-A, and may identify the type of the resource set included in the inter-UE coordination information. The UE-B may select candidate resource(s) for sidelink communication based on the resource set included in the inter-UE coordination information. For example, when the inter-UE coordination information includes the resource set A, the UE-B may select candidate resource(s) including resource(s) belonging to the resource set A. When the inter-UE coordination information includes the resource set B or resource set C, the UE-B may exclude resource(s) belonging to the resource set B or resource set C in a procedure of selecting candidate resource(s). In order to support the operation of the UE-B, condition(s) for identifying the type of the resource set may be required.

The information indicated by the inter-UE coordination information may differ depending on an inter-UE coordination scheme 1 or inter-UE coordination scheme 2. When the inter-UE coordination scheme 1 is used, the inter-UE coordination information may indicate the resource set A, resource set B, and/or resource set C. When the inter-UE coordination scheme 2 is used, the inter-UE coordination information may indicate existence of the resource set A, resource set B, and/or resource set C.

When inter-UE coordination information is transmitted, a method for distinguishing whether the inter-UE coordination information is indicated by the inter-UE coordination scheme 1 or inter-UE coordination scheme 2 may be required. When the inter-UE coordination scheme 1 is used, a method for distinguishing the type of resource set (i.e. resource set A, B, and/or C) indicated by the inter-UE coordination information may be required. When the inter-UE coordination scheme 2 is used, a method for distinguishing which resource conflict the inter-UE coordination information indicates may be required. The UE-B may select candidate resource(s) based on the inter-UE coordination information (e.g. resource set A, B, and/or C). For example, when the inter-UE coordination scheme 1 is used and the inter-UE coordination information indicates the resource set A (i.e. preferred resources), the UE-B may select candidate resource(s) for (re)transmission, which include the resources indicated by the inter-UE coordination information. When the inter-UE coordination scheme 1 is used and the inter-UE coordination information indicates the resource set B (i.e. non-preferred resources), the UE-B may select candidate resource(s) for (re)transmission from among resources excluding the resources indicated by the inter-UE coordination information.

The inter-UE coordination information may include one or more information elements defined in Table 3 below.

TABLE 3

| Information elements |
|---|
| Preferred resources |
| Channel state information (CSI) satisfied by preferred resources |
| Non-preferred resources and/or information indicating non-preferred resources |
| Information on continuous conflicts and/or information on resource conflict(s) |
| Power control information (e.g. information on a power of the UE-B) |
| Source ID (e.g. source ID having the minimum length) |
| Destination ID (e.g. destination ID having the minimum length) |
| Demodulation reference signal (DMRS) pattern preferred by the UE-A (e.g. receiving UE) |
| Multi-input multi-output (MIMO) enhancement information |
| When a plurality of resources (e.g. three resources) are reserved by a single PSCCH/PSSCH (e.g. single SCI), information on the reserved resources |
| Information of resources for which reservation is released |
| Information of not-used resources among reserved resources |
| Discontinuous reception (DRX) parameter(s) |
| Information not received by the UE-B (e.g. transmitting UE) due to a half-duplex operation |
| Information for estimating a distance between communication nodes (e.g. UEs) |
| Reference signal received power (RSRP), reference signal received quality (RSRQ), or received signal strength indicator (RSSI) |
| Location information of a receiving UE |
| Priority information (e.g. priority information of inter-UE coordination information) |

The inter-UE coordination information may be transmitted through one or more containers defined in Table 4 below.

TABLE 4

| Container |
|---|
| First stage SCI (e.g. SCI format 1-A) |
| Second stage SCI (e.g. SCI format 2-A, SCI format 2-B, SCI format 2-C) |
| New second stage SCI (e.g. SCI format 2-D) |
| MAC CE |
| RRC message (e.g. PC5-RRC message) |
| PSFCH (e.g. PSFCH format) |

The transmission of inter-UE coordination information may be performed based on an explicit trigger scheme or an event trigger scheme. When the explicit trigger scheme is used, the UE-B may transmit a trigger message or a request message for transmission of inter-UE coordination information to the UE-A. When the trigger message or request message is received from the UE-B, the UE-A may transmit inter-UE coordination information to the UE-B. When the event triggered scheme is used, the UE-A may transmit inter-UE coordination information to the UE-B when preconfigured condition(s) or predefined condition(s) are satisfied.

Depending on the type of information elements included in the inter-UE coordination information, a resource in which the corresponding inter-UE coordination information is transmitted (e.g. frequency resource, time resource, resource mapping information) and/or a container in which the corresponding inter-UE coordination information is transmitted may be configured differently. According to the above-described operation, the UE (e.g. UE-B) may efficiently perform a decoding operation of the received inter-UE coordination information.

Once resources (e.g. potential resources) for UE-B's (re)transmission are configured, the UE-A may use the configured resources or some resources from among the configured resources to transmit the inter-UE coordination information. The inter-UE coordination information may be transmitted using a specific container. When the UE-A is a receiving UE, the UE-A may know in advance information on a resource in which inter-UE coordination information is transmitted based on a decoding result of SCI. When the UE-A is not a receiving UE (e.g. when the UE-A is a UE (e.g. coordinating UE) supporting sidelink communications of another UE or a UE performing a similar role as the coordinating UE), the UE-A may know information on a transmission resource of the UE-B in advance by performing an overhearing operation on the UE-B's SCI. The above-described operation may be applied when the UE-A is a receiving UE.

The inter-UE coordination information may be classified into first inter-UE coordination information and second inter-UE coordination information. The first inter-UE coordination information may be referred to as primary inter-UE coordination information, and the second inter-UE coordination information may be referred to as secondary inter-UE coordination information. Information element(s) included in the first inter-UE coordination information may be more important/necessary information element(s) for resource selection for (re)transmission of the UE-B than information element(s) included in the second inter-UE coordination information. Alternatively, the information element(s) included in the second inter-UE coordination information may be more important/necessary information element(s) for resource selection for (re)transmission of the UE-B than the information element(s) included in the first inter-UE coordination information. For example, the first inter-UE coordination information may include information indicating that the second inter-UE coordination information is transmitted, and the second inter-UE coordination information may include information elements (e.g. information element(s) defined in Table 3) used for resource selection for (re)transmission of the UE-B. In the instant case, the first inter-UE coordination information may be transmitted through a first-stage SCI (e.g. SCI format 1-A), and the second inter-UE coordination information may be transmitted through a second-stage SCI (e.g. SCI format 2-C).

A specific resource and/or specific container may be used for transmission of the first inter-UE coordination information. The second inter-UE coordination information may be transmitted through a resource and/or container other than the specific resource and/or specific container used for transmission of the first inter-UE coordination information. The first inter-UE coordination information may include at least one of a source ID (e.g. a source ID with the minimum length for a receiving UE), a destination ID (e.g. a destination ID with the minimum length for the receiving UE), priority information (e.g. priority information for the inter-UE coordination information), an RSRP for a link between the UEs, location information of the receiving UE, information indicating preferred resources, or information indicating non-preferred resources.

Figure 7:
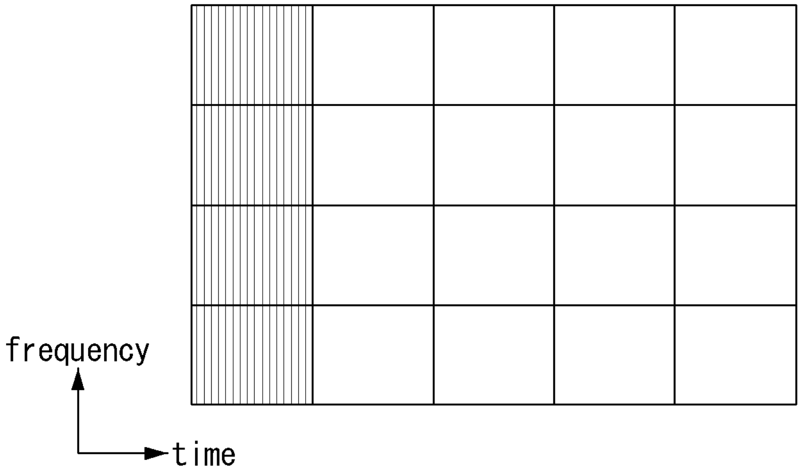
FIG. 7 is a conceptual diagram illustrating various exemplary embodiments of transmission resources of inter-UE coordination information.

FIG. 7 is a conceptual diagram illustrating a first exemplary embodiment of transmission resources of inter-UE coordination information.

As shown in FIG. 7, inter-UE coordination information (e.g. first inter-UE coordination information and/or second inter-UE coordination information) may be transmitted using a specific resource. The resource through which the inter-UE coordination information is transmitted may be one or more subchannels among resources for (re)transmission of the UE-B (e.g. potential resources, multiple subchannels). The number of the multiple subchannels may be set by higher layer signaling (e.g. sl-NumSubchannel). For example, the inter-UE coordination information may be transmitted through one or more subchannels for a first slot (e.g. the earliest slot) in the time domain. The first slot may be a first slot among pre-configured resources (e.g. resources within a resource pool, resources configured by SCI). Alternatively, the first slot may be a slot in which the SCI (e.g. first-stage SCI and/or second-stage SCI) associated with the inter-UE coordination information is transmitted. The UE-B may receive the inter-UE coordination information from the UE-A in some of reserved resources before starting transmission in the resources reserved e.g. scheduled resources, allocated resources) by its SCI, and may perform a transmission operation considering the inter-UE coordination information. Some of the reserved resources in which the inter-UE coordination information is received may be one or more subchannels for the first slot in the time domain.

Figure 8:
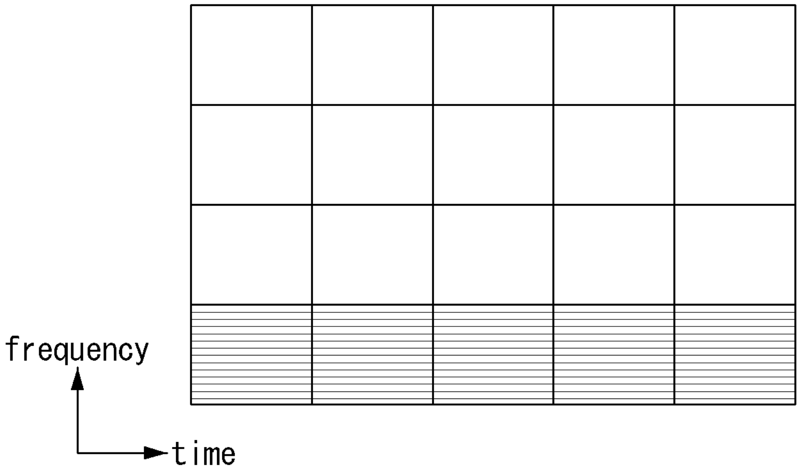
FIG. 8 is a conceptual diagram illustrating various exemplary embodiments of transmission resources of inter-UE coordination information.

FIG. 8 is a conceptual diagram illustrating a second exemplary embodiment of transmission resources of inter-UE coordination information.

As shown in FIG. 8, inter-UE coordination information (e.g. first inter-UE coordination information and/or second inter-UE coordination information) may be transmitted through a subchannel with the smallest (or largest) index among a plurality of subchannels (e.g. a plurality of subchannels configured by higher layer signaling). In the instant case, the inter-UE coordination information may be transmitted using one or more slots in the subchannel with the smallest index (or largest index). The UE-B may receive the inter-UE coordination information from the UE-A in the above-described resources and perform a transmission operation based on the inter-UE coordination information. The inter-UE coordination information may be included in the first-stage SCI and/or second-stage SCI. The resources through which the inter-UE coordination information is transmitted and received may be some or all of the resources reserved by the SCI of the UE-B.

Figure 9:
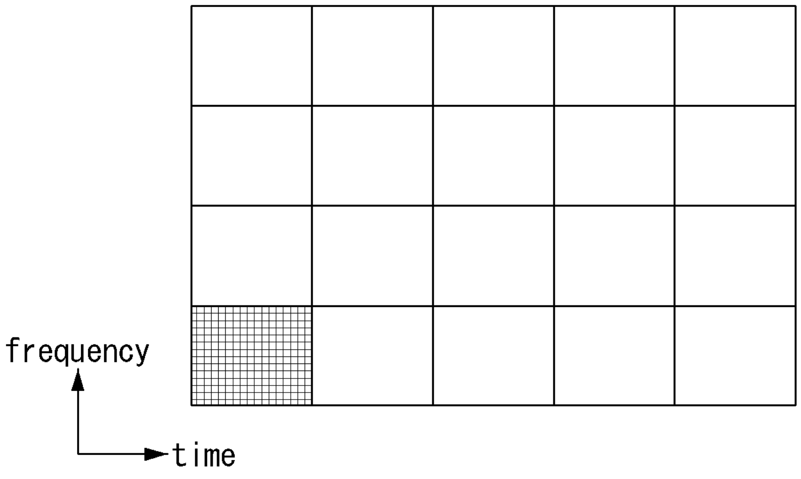
FIG. 9 is a conceptual diagram illustrating various exemplary embodiments of transmission resources of inter-UE coordination information.

FIG. 9 is a conceptual diagram illustrating a third exemplary embodiment of transmission resources of inter-UE coordination information.

As shown in FIG. 9, inter-UE coordination information (e.g. first inter-UE coordination information and/or second inter-UE coordination information) may be transmitted using a first slot in a subchannel with the smallest (or largest) index among a plurality of subchannels (e.g. a plurality of subchannels configured by higher layer signaling). The first slot may be a first slot among pre-configured resources (e.g. resources within a resource pool, resources configured by SCI). Alternatively, the first slot may be a slot in which the SCI (e.g. first-stage SCI and/or second-stage SCI) associated with the inter-UE coordination information is transmitted. The UE-B may receive the inter-UE coordination information from the UE-A in the above-described resources and perform a transmission operation based on the inter-UE coordination information. The inter-UE coordination information may be included in the first-stage SCI and/or second-stage SCI. The resources through which the inter-UE coordination information is transmitted and received may be some or all of the resources reserved by the SCI of the UE-B.

Offset information for preferred resources and/or non-preferred resources may be included in the inter-UE coordination information (e.g. first inter-UE coordination information and/or second inter-UE coordination information). In the exemplary embodiment of FIG. 7, the offset information may indicate a frequency offset, and in the exemplary embodiment of FIG. 8, the offset information may indicate a time offset (e.g. symbol offset, slot offset). For example, the offset information may indicate an offset (e.g. time offset, frequency offset) between a resource (e.g. reference resource, reference slot, reference symbol, reference subcarrier, reference resource block (RB), reference subchannel) in which the first-stage SCI (e.g. SCI format 1-A) is transmitted and the preferred resources. When the offset information indicates a slot offset, the slot offset may be an offset between a reference slot and a slot where the preferred resources are located (e.g. the first slot among slots where the preferred resources are located). When the offset information indicates a symbol offset, the symbol offset may be an offset between a reference symbol and a symbol where the preferred resources are located (e.g. the first symbol among symbols where the preferred resources are located). When the offset information indicates a subchannel offset, the subchannel offset may be an offset between a reference subchannel and a subchannel where the preferred resources are located (e.g. the first subchannel among subchannels where the preferred resources are located).

Alternatively, the offset information may indicate an offset (e.g. time offset, frequency offset) between the resource (e.g. reference resource, reference slot, reference symbol, reference subcarrier, reference RB, reference subchannel) in which the first-stage SCI is transmitted and the non-preferred resources. When the offset information indicates a slot offset, the slot offset may be an offset between a reference slot and a slot where the non-preferred resources are located (e.g. the first slot among slots where the non-preferred resources are located). When the offset information indicates a symbol offset, the symbol offset may be an offset between a reference symbol and a symbol where the non-preferred resources are located (e.g. the first symbol among symbols where the non-preferred resources are located). When the offset information indicates a subchannel offset, the subchannel offset may be an offset between a reference subchannel and a subchannel where the non-preferred resources are located (e.g. the first subchannel among subchannels where the non-preferred resources are located).

The second inter-UE coordination information excluding the first inter-UE coordination information may be transmitted through the second-stage SCI (e.g. SCI format 2-C). Alternatively, transmission of the first inter-UE coordination information may be configured as a default operation, and the second inter-UE coordination information may be transmitted selectively. In the instant case, the second inter-UE coordination information may be transmitted when necessary or when a preconfigured condition is satisfied.

If the number of information elements included in the first inter-UE coordination information is large, the size of the first inter-UE coordination information (e.g. payload including the first inter-UE coordination information) may increase. In the instant case, the first inter-UE coordination information may be transmitted using a different container. The container used for transmission of the first inter-UE coordination information and/or the second inter-UE coordination information may vary depending on a payload size thereof. For example, the first inter-UE coordination information may be transmitted through an SCI (e.g. first-stage SCI and/or second-stage SCI), and the second inter-UE coordination information may be transmitted through a MAC CE and/or RRC message (e.g. PC5-RRC message).

The inter-UE coordination information (e.g. first inter-UE coordination information and/or second inter-UE coordination information) may be transmitted in a specific symbol (or specific slot) or from a specific symbol (or a specific slot) within the resource pool. The specific symbol (or specific slot) may be the first symbol (or first slot) through which the inter-UE coordination information is transmitted. Information on the first symbol (or first slot) may be included in the corresponding inter-UE coordination information. The information of the first symbol (or first slot) may be expressed as an offset with a symbol (or slot) through which the first stage SCI (e.g. SCI format 1-A) is transmitted. The specific symbol may be a specific symbol within the first slot in one or more subchannels. The specific symbol may be the first symbol capable of transmitting inter-UE coordination information within the first slot.

When the first-stage SCI, second-stage SCI, and/or data (e.g. shared channel (SCH), PSSCH) are allowed to be multiplexed in the frequency domain within a specific slot, the inter-UE coordination information (e.g. first inter-UE coordination information and/or second inter-UE coordination information) may be transmitted starting from the first symbol capable of transmitting the inter-UE coordination information within the specific slot described above. Alternatively, when the first-stage SCI, second-stage SCI, and/or data (e.g. SCH, PSSCH) are not allowed to be multiplexed in the frequency domain within a specific slot, the inter-UE coordination information (e.g. first inter-UE coordination information and/or second inter-UE coordination information) may be transmitted starting from the first symbol capable of transmitting the inter-UE coordination information within the specific slot described above.

As another method, in transmission of the first inter-UE coordination information, the first-stage SCI, second-stage SCI, and/or data (e.g. SCH, PSSCH) may be allowed to be multiplexed in the frequency domain within a specific slot. In the instant case, the first inter-UE coordination information may be transmitted starting from the first symbol capable of transmitting the first inter-UE coordination information within the specific slot described above. In the transmission of second inter-UE coordination information, the first-stage SCI, second-stage SCI, and/or data (e.g. SCH, PSSCH) may not be allowed to be multiplexed in the frequency domain within a specific slot. In the instant case, the second inter-UE coordination information may be transmitted starting from the first symbol capable of transmitting the second inter-UE coordination information within the specific slot described above.

As another method, in transmission of the first inter-UE coordination information, the first-stage SCI, second-stage SCI, and/or data (e.g. SCH, PSSCH) may not be allowed to be multiplexed in the frequency domain within a specific slot are. In the instant case, the first inter-UE coordination information may be transmitted starting from the first symbol capable of transmitting the first inter-UE coordination information within the specific slot described above. In transmission of the second inter-UE coordination information, the first-stage SCI, second-stage SCI, and/or data (e.g. SCH, PSSCH) may be allowed to be multiplexed in the frequency domain within a specific slot. In the instant case, the second inter-UE coordination information may be transmitted starting from the first symbol capable of transmitting the second inter-UE coordination information within the specific slot described above.

"The inter-UE coordination information is transmitted starting from the first symbol capable of transmitting the inter-UE coordination information (e.g. the earliest transmittable symbol) within the specific slot" may mean "the inter-UE coordination information is transmitted as being mapped from the lowest frequency (e.g. the frequency having the lowest index or order) of the first symbol".

The inter-UE coordination information (e.g. first inter-UE coordination information and/or second inter-UE coordination information) may be transmitted periodically. In the instant case, a parameter indicating a transmission periodicity of the inter-UE coordination information may be transmitted through at least one of SCI, MAC CE, or higher layer signaling (e.g. RRC signaling). The inter-UE coordination information may include information indicating the transmission periodicity of the inter-UE coordination information. The transmission periodicity of the inter-UE coordination information may be set to be the same as a transmission periodicity of a PSFCH or data associated with the inter-UE coordination information. Alternatively, the transmission periodicity of the inter-UE coordination information may be set to N times or 1/N times the transmission periodicity of the PSFCH or data associated with the corresponding inter-UE coordination information. N may be a natural number. Alternatively, the base station or network may set the transmission periodicity of the inter-UE coordination information and signal information on the transmission periodicity of the inter-UE coordination information. The inter-UE coordination information may be configured resource pool-specific ally and/or service-specifically.

In the above-described exemplary embodiments, it has been described that one UE receives inter-UE coordination information from another UE, but the above-described exemplary embodiments may also be applied to a scenario in which one UE receives inter-UE coordination information from a plurality of UEs. For example, the inter-UE coordination information may be transmitted and received as follows.

Each UE-A may transmit inter-UE coordination information including priority information. The priority information may be included in the first inter-UE coordination information and/or second inter-UE coordination information. The UE-B may receive a plurality of pieces of inter-UE coordination information from a plurality of UE-As, select one piece of inter-UE coordination information based on priority information included in each of the plurality of pieces of inter-UE coordination information, and perform a transmission operation based on the selected inter-UE coordination information.

The UE-B may determine whether inter-UE coordination information is inter-UE coordination information to be used by itself by first decoding only priority information included in the inter-UE coordination information. For example, the UE-B may receive first inter-UE coordination information from the UE-A and identify priority information included in the first inter-UE coordination information. If the inter-UE coordination information is identified to have a high priority, the UE-B may perform a reception operation (e.g. decoding operation) of second inter-UE coordination information associated with the first inter-UE coordination information. On the other hand, when the priority of the inter-UE coordination information is identified to have a low priority, the UE-B may not perform a reception operation (e.g. decoding operation) of the second inter-UE coordination information associated with the first inter-UE coordination information. The first inter-UE coordination information may include at least one of a source ID (e.g. a source ID with the minimum length for the receiving UE), a destination ID (e.g. a destination ID with the minimum length for the receiving UE), priority information (e.g. priority information for the inter-UE coordination information), an RSRP for a link between the UEs, or location information of the receiving UE.

Based on the above-described method, the UE-B may select inter-UE coordination information provided by a specific UE-A among a plurality of pieces of inter-UE coordination information received from a plurality of UE-As. When the first inter-UE specific information is transmitted through a specific resource or a specific container, the above-described operation may be performed efficiently.

The priority information of inter-UE coordination information may be interpreted as priority information of data. The data may be data transmitted and received in resources selected based on the inter-UE coordination information. The priority information of the data may be included in the first-stage SCI. The UE may set the priority of the inter-UE coordination information based on the priority of the data. For example, inter-UE coordination information and data associated with the inter-UE coordination information may have the same priority. Priorities of multiple pieces of inter-UE coordination information according to the same scheme (e.g. inter-UE coordination scheme 1 or inter-UE coordination scheme 2) may be determined. Priorities of multiple pieces of inter-UE coordination information according to different schemes may be determined.

When the scheme 2 (e.g. inter-UE coordination scheme 2) is used, information indicating a resource conflict (hereinafter referred to as 'resource conflict information') may be transmitted on a PSFCH. When a priority of PSFCH transmission for the resource conflict information is not set (e.g. preset), the priority of PSFCH transmission may be the lowest priority of a conflicting transport block (TB). Alternatively, the priority of PSFCH transmission for the resource conflict information may be a value (e.g. preset value) set among priority values including 9 existing priority values.

If a priority of PSFCH reception for resource conflict information is not set (e.g. preset), the priority of PSFCH reception may be a priority indicated by the SCI of the UE-B. Alternatively, the priority of PSFCH reception for resource conflict information may be a value (e.g. preset value) set among priority values including 9 existing priority values.

The above-described exemplary embodiments may be applied to a scenario in which one UE-B receives inter-UE coordination information from one UE-A, a scenario in which multiple UE-Bs receive inter-UE coordination information from one UE-A, and/or a scenario in which one UE-B receives a plurality of inter-UE coordination information from a plurality of UE-As.

The inter-UE coordination information (e.g. transmission and reception operations of the inter-UE coordination information) may be configured specifically, independently, or commonly based on at least one of a resource pool, service type, priority, whether power saving operations are performed, QoS parameters (e.g. reliability, latency), cast type, or terminal type (e.g. vehicle (V)-UE or pedestrian (P)-UE). The above-described configuration may be performed by the network and/or base station. Alternatively, the operation (e.g. operation of selecting the method) of the above-described UE (e.g. UE-A and/or UE-B) may be implicitly determined based on preconfigured parameter(s).

In the above-described exemplary embodiment, whether or not to apply each method (e.g. each rule) may be configured based on at least one of a condition, a combination of conditions, a parameter, or a combination of parameters. Whether or not to apply each method may be configured by the network and/or base station. Whether or not to apply each method is configured resource pool-specifically or service-specifically. Alternatively, whether or not to apply each method may be configured by PC5-RRC signaling between UEs.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

In the present specification, unless particularly stated otherwise, a singular expression includes a plural expression unless the context clearly indicates otherwise.

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of a first user equipment (UE), the method comprising:
   transmitting, to a second UE, first sidelink control information (SCI) including first inter-UE coordination information through a control channel;
   generating second inter-UE coordination information including offset information for preferred resources or non-preferred resources; and
   transmitting, to the second UE, second SCI including the second inter-UE coordination information through a data channel scheduled by the first SCI,
   wherein the offset information includes a subchannel offset, and the subchannel offset is an offset between a reference subchannel and a subchannel where the preferred resources or the non-preferred resources are located.

2. The method of claim 1, wherein the first inter-UE coordination information is information indicating that the second SCI including the second inter-UE coordination information is transmitted.

3. The method of claim 1, wherein the offset information further includes a slot offset, and the slot offset is an offset between a reference slot and a slot where the preferred resources or the non-preferred resources are located.

4. The method of claim 3, wherein the slot is a first slot among slots where the preferred resources or the non-preferred resources are located, and the reference slot is a slot where the first SCI is transmitted.

5. The method of claim 1, wherein the subchannel is a first subchannel among subchannels where the preferred resources or the non-preferred resources are located, and the reference subchannel is a subchannel where the first SCI is transmitted.

6. The method of claim 1, wherein the second inter-UE coordination information further includes priority information for the second inter-UE coordination information.

7. A method of a second user equipment (UE), the method comprising:
   receiving, by a processor, from a first UE, first sidelink control information (SCI) including first inter-UE coordination information through a control channel;
   receiving, by the processor, from the first UE, second SCI including second inter-UE coordination information through a data channel scheduled by the first SCI;
   identifying, by the processor, preferred resources or non-preferred resources based on offset information for the preferred resources or the non-preferred resources, the offset information being included in the second inter-UE coordination information;
   selecting, by the processor, resources for sidelink communication in consideration of the preferred resources or the non-preferred resources; and
   performing, by the processor, the sidelink communication using the selected resources,
   wherein the offset information includes a subchannel offset, and the subchannel offset is an offset between a reference subchannel and a subchannel where the preferred resources or the non-preferred resources are located.

8. The method of claim 7, wherein the first inter-UE coordination information is information indicating that the second SCI including the second inter-UE coordination information is transmitted.

9. The method of claim 7, wherein the offset information further includes a slot offset, and the slot offset is an offset between a reference slot and a slot where the preferred resources or the non-preferred resources are located.

10. The method of claim 9, wherein the slot is a first slot among slots where the preferred resources or the non-preferred resources are located, and the reference slot is a slot where the first SCI is received.

11. The method of claim 7, wherein the subchannel is a first subchannel among subchannels where the preferred resources or the non-preferred resources are located, and the reference subchannel is a subchannel where the first SCI is received.

12. The method of claim 7, wherein the second inter-UE coordination information further includes a first priority for the second inter-UE coordination information.

13. The method of claim 12, further including:
   receiving, from a third UE, third inter-UE coordination information including a second priority; and
   comparing the first priority of the second inter-UE coordination information and the second priority of the third inter-UE coordination information,
   wherein in response that the first priority is higher than the second priority, the second inter-UE coordination information is used to select resources for the sidelink communication.

14. A second user equipment (UE) comprising:
   a processor; and
   a memory storing one or more instructions executable by the processor,
   wherein the one or more instructions are executed by the processor to perform:
   receiving, from a first UE, first sidelink control information (SCI) including first inter-UE coordination information through a control channel;
   receiving, from the first UE, second SCI including second inter-UE coordination information through a data channel scheduled by the first SCI;
   identifying preferred resources or non-preferred resources based on offset information for the preferred resources or the non-preferred resources, the offset information being included in the second inter-UE coordination information;
   selecting resources for sidelink communication in consideration of the preferred resources or the non-preferred resources; and
   performing the sidelink communication using the selected resources,
   wherein the offset information includes a subchannel offset, the subchannel offset is an offset between a reference subchannel and a subchannel where the preferred resources or the non-preferred resources are located.

15. The second UE of claim 14, wherein the first inter-UE coordination information is information indicating that the second SCI including the second inter-UE coordination information is transmitted.

16. The second UE of claim 14, wherein the offset information further includes a slot offset, the slot offset is an offset between a reference slot and a slot where the preferred resources or the non-preferred resources are located, and the reference slot is a slot where the first SCI is received.

17. The second UE of claim 14, wherein the reference subchannel is a subchannel where the first SCI is received.

18. The second UE of claim 14, wherein the one or more instructions are further executed to perform:

receiving, by the processor, from a third UE, third inter-UE coordination information including a second priority; and comparing, by the processor, a first priority of the second inter-UE coordination information and the second priority of the third inter-UE coordination information, wherein in response that the first priority is higher than the second priority, the second inter-UE coordination information is used to select resources for the sidelink communication, and wherein the first priority is included in the first inter-UE coordination information.

* * * * *